United States Patent [19]

Machida

[11] 4,193,720

[45] Mar. 18, 1980

[54] CRITICAL TORQUE DETECTOR

[76] Inventor: Kenji Machida, 2-12 Miyamoto-Cho, Itabashi-ku, Tokyo, Japan

[21] Appl. No.: 824,655

[22] Filed: Aug. 15, 1977

[51] Int. Cl.² ............................................. B23B 47/24
[52] U.S. Cl. ........................................ 408/11; 408/6; 408/140
[58] Field of Search .................................. 408/8–13, 408/6, 5, 17, 127, 139, 140

[56] References Cited

U.S. PATENT DOCUMENTS

| | | |
|---|---|---|
| 2,562,170 | 7/1951 | Busemeyer ............................ 408/11 |
| 2,928,297 | 3/1960 | Svenson ................................ 408/11 |
| 3,989,405 | 11/1976 | Quackenbush ........................ 408/11 |

FOREIGN PATENT DOCUMENTS

| | | | |
|---|---|---|---|
| 2134142 | 2/1973 | Fed. Rep. of Germany ............. 408/10 |
| 2157984 | 5/1973 | Fed. Rep. of Germany ............ 408/139 |
| 320350 | 11/1971 | U.S.S.R. ....................................... 408/6 |
| 385680 | 6/1973 | U.S.S.R. ..................................... 408/11 |

*Primary Examiner*—Leonidas Vlachos

*Attorney, Agent, or Firm*—Olsen and Stephenson

[57] ABSTRACT

A critical torque detector is disclosed made up of a rotating input member, an output member supporting a drill and connected in a "flexible driving connection" with the input rotating member, and means for detecting difference in rotational speed between the input and output members due to a greater torsional resistance encountered by the drill during its operation than the critical torque predetermined for a specific drill. The input and output members are drivingly connected, as by a coil spring, magnetic repelling forces and so on, so as to rotate conjointly whenever a torsional resistance or a torque encountered by a running drill is lower than the predetermined value, but they are not always rigidly connected. Upon occurrence of greater torque imposed on the drill, the output member will be permitted to delay in rotation as compared to the input member. Such difference in rotational speed can be taken out mechanically or electromagnetically as a signal to detect occurrence of the critical torque.

1 Claim, 21 Drawing Figures

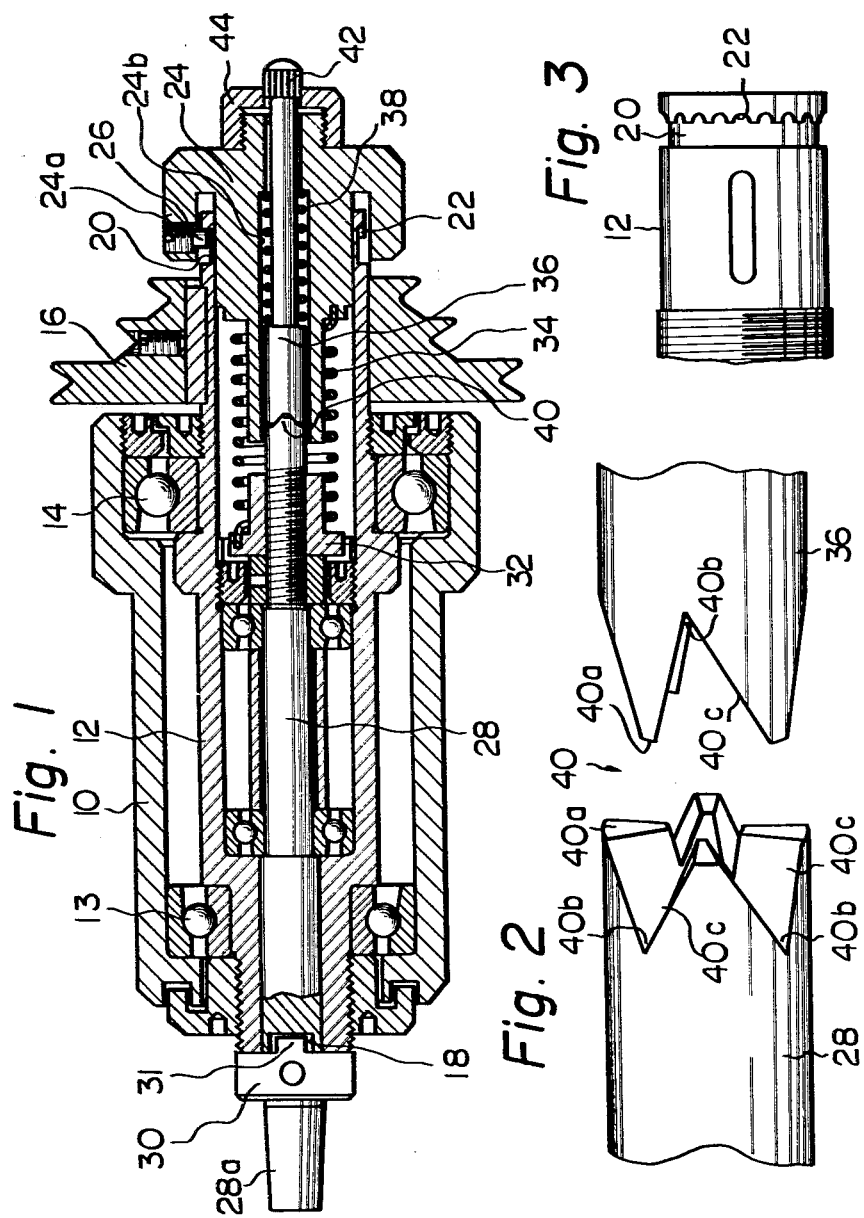

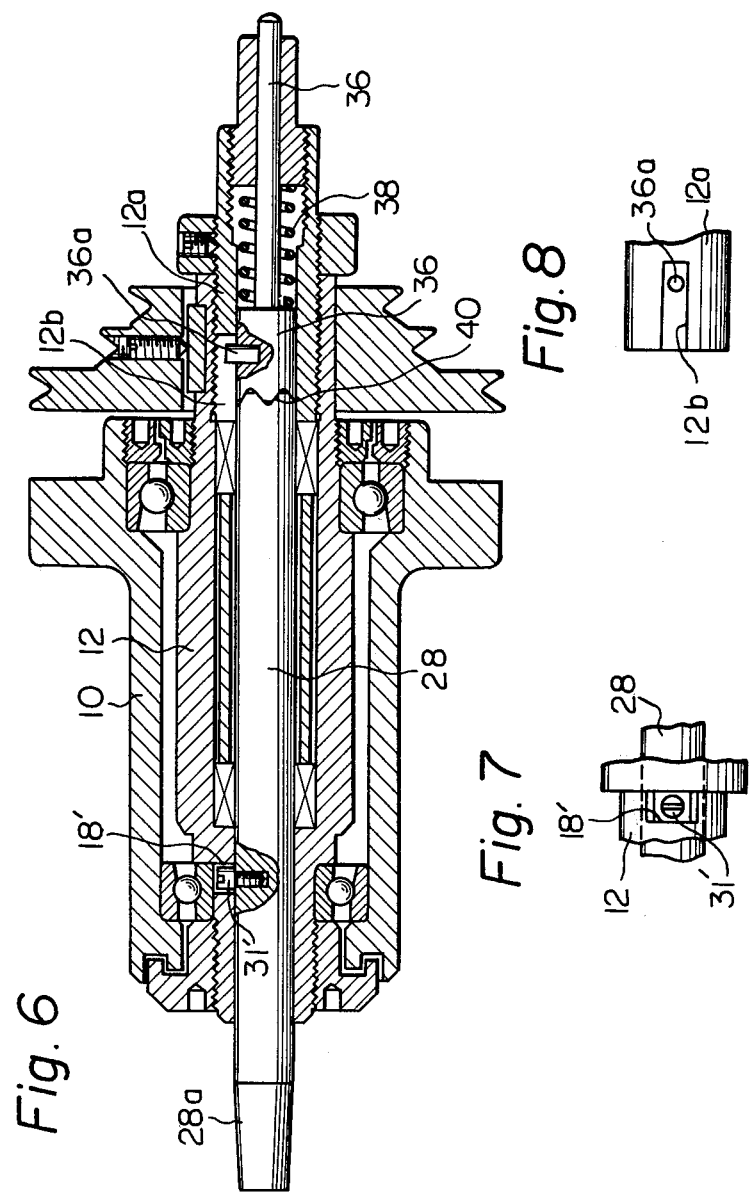

CRITICAL TORQUE DETECTOR

GENERAL DESCRIPTION OF THE INVENTION

The present invention relates to an apparatus for detecting a critical twisting moment or a critical torque which can be tolerated by a drill used for drilling operation.

In performing a drilling operation to form a hole or holes in the hard material such as hard metal, it is usual to employ a drill or a twist drill having a diameter corresponding to the diameter of the hole to be formed. Where the small hole is to be formed, a thin drill or a drill having a small diameter must be used. Where the depth of the hole becomes greater, the drill will be subjected to an increasingly great resistance or twisting moment. If such resistance or twisting moment exceeds a critical torque, i.e. a torque which can be tolerated by a specific drill, it will break down. Since the critical torque depends on the hardness of workpieces, the sharpness of the drill being used, the diameter and/or the depth of the hole to be formed, it is not worthy to predetermine or predict the amount of a critical torque for a specific drill in terms of, for example, the depth of holes. It is highly desirable to detect momentarily the torque which the specific drill now performing drilling operation undergoes actually and, upon detecting of it, retract the drill from the hole being formed. However, particularly with respect to the thin drill or a drill having a small diameter, such a detector as can be used in connection with a drill actually performing a drilling operation has been unknown in the art.

OBJECTS OF THE INVENTION

It is an object of the present invention to provide means for detecting a critical torque for the drill which is actually running or performing a drilling operation.

It is another object of the present invention to provide a mechanism for detecting the critical torque for the specific drill and, upon detecting of it, retract the drill from the hole to be formed to avoid failure of the drill.

It is a further object of the invention to provide means for detecting the twisting moment or the torque which is now undergone by a specific drill thereby to determine the sharpness of that drill.

These and other objects are accomplished in accordance with the present invention by providing an input rotating member and an output driven member for supporting a drill which is rotated by the input rotating member through a flexible driving connection therebetween. A "flexible driving connection" means such a connection that allows the input and output member to rotate conjointly when the drill in use is subject to a torque lower than the predetermined critical torque, but causes the output member to be delayed in rotation with regard to the input member when the torque which is imposed on the rotating drill reaches or exceeds the predetermined critical torque. Such delay in rotation will be detected by a detecting 1/10-provided in accordance with the present invention. Detecting means function mechanically or electromagnetically to indicate the dangerous condition in which the drill now performing a drilling operation is nearly to breakdown. A signal produced by detecting means is sent to a control system, e.g., hydraulic control circuit for controlling the movement of the drill assembly to retract the drill from the drilling site thereby to avoid the possible failure of the drill. After the causes of greater resistance, such as chips in the hole, are removed, the drill is again advanced to the drilling site. Whenever the drill is subject to a torque exceeding the critical torque, it is automatically retracted and then again advanced to finish the hole. Thus, in accordance with the invention, an extremely thin drill, such as a diameter of 1/10 ½ mm, can be used to perform the drilling operation without any risk of breakdown. Also, in accordance with the invention the drill can enjoy longer life than in the prior drilling machine. Further, by employing different drills on the same workpiece for testing purpose, it is possible to determine the sharpness of the particular drill. The most sharp drill will be most delayed to commence retracting cycle.

Heretofore, a number of means are known as to detect the critical torque for relatively thick drill, e.g., having a diameter of 10 mm. When such drill is subject to an exceedingly great torque, an electric motor for driving the drill is imposed an overload to cause electric current flowing therethrough to vary. By detecting such variation in electric current, it is possible to control the driving system for the drill assembly. However, for thin or extremely thin drill, e.g. of 1/10 mm of diameter, the variation of electric current flowing through the driving motor is so small that it is virtually impossible to detect such variation. Thus, the skilfulness of manual labor has been the only measure to rely on to avoid the breakdown for the extremely thin drill.

The present invention provides for means to automatically detect the critical torque on the extremely thin drill without any skilfulness. For example, in accordance with the present invention, it has been noted that a head used in an injection nozzle of an diesel engine can be formed automatically and rapidly with a plurality of extremely small holes having diameter of 0.14 mm and depth of 1 mm without any difficulty. Consequently, the diesel engine itself can be compacted to an unexpectedly small dimensions. Further, the present invention enables to form a hole having diameter of 0.3 mm and depth of 1 mm or more in the top of the needle for use in the medical treatment having diameter of about 1 mm, which could not be attained by any prior art drilling machine.

GENERAL DESCRIPTION OF THE DRAWINGS

FIG. 1 is a sectional elevational view partly broken away of a first embodiment of the invention;

FIG. 2 is an enlarged partial perspective view showing mating cam surfaces of a spindle and a reaction rod shown in FIG. 1;

FIG. 3 is an enlarged partial plan view showing the configuration of the rear end of an input sleeve shown in FIG. 1;

FIG. 6 is an variation of the embodiment shown in FIG. 1;

FIG. 7 is a partial plan view showing a spindle and sleeve used in FIG. 6;

FIG. 8 is a partial plan view showing a second sleeve and a pin of a reaction rod;

DETAILED DESCRIPTION OF THE INVENTION

Figure 4:
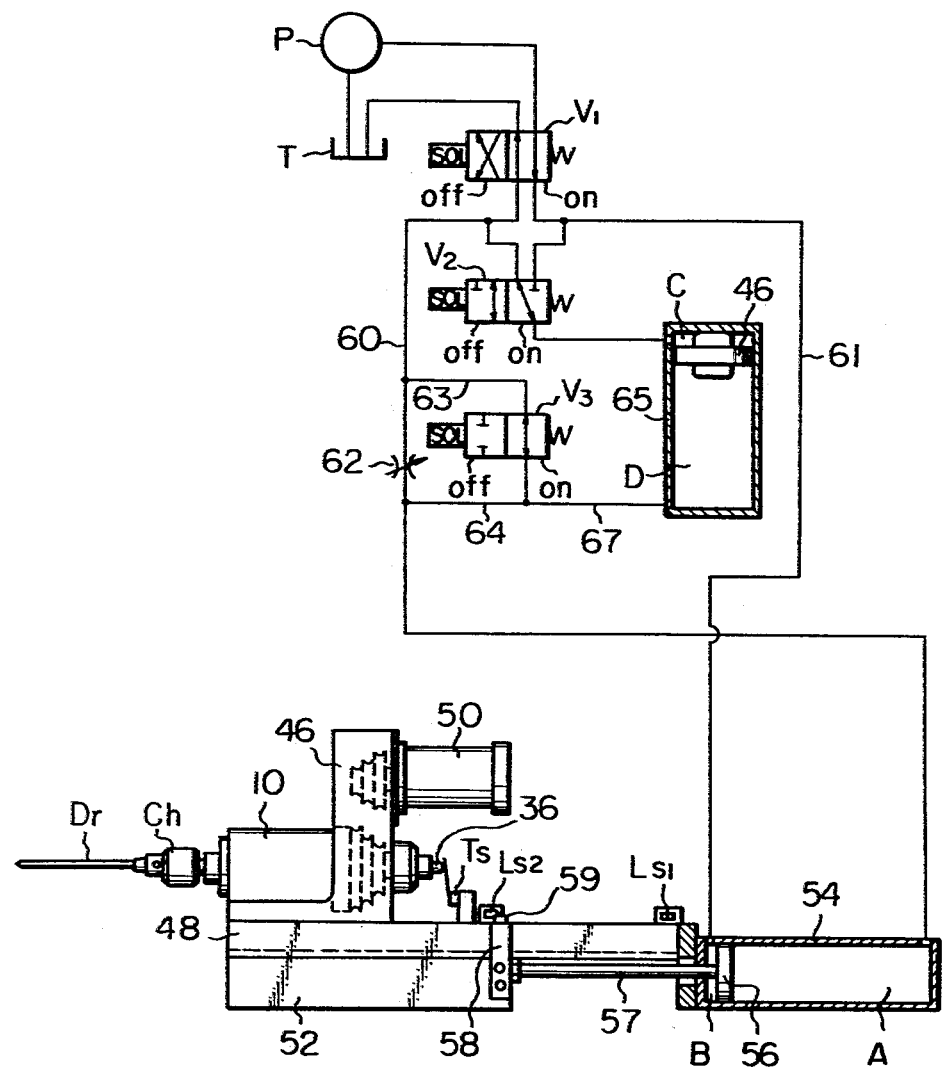
FIG. 4 is a hydraulic circuit for controlling the movement of the drill assembly.

Referring now to the drawings, FIG. 1 shows a first embodiment of the present invention. A stationary casing 10 supports therein rotatably an input member or a driving sleeve member 12 by means of bearings 13 and 14. The input or driving sleeve member 12 receives rotating forces through a pulley 16 keyed thereon. The sleeve 12 has at its forward end (left hand in FIG. 1) two notched portions 18 (only one of them is shown in FIG. 1) and at its rear end an annular groove 20. The groove 20 is formed with a plurality of semi-circular pockets 22 on its rear side as shown in detail in FIG. 3. In the rear end of the sleeve 12 is inserted a plug member 24 which has an outer extension 24a surrounding the outer circumference of the rear end of the sleeve 12. The outer extension 24a has at its free end a pin 26 which extends into the annular groove 20 and engages with any one of pockets 22. The plug member 24 is formed with a centrally and longitudianlly extending opening 24b.

A spindle 28, which is to be called as driven member or output member, is disposed coaxially within the driving sleeve 12 and supported rotatably by bearings as shown in FIG. 1. The spindle 28 has a nose end 28a projecting beyond the forward end of the sleeve 12 where a drill or a twist drill Dr is to be attached by means of a drill chuck Ch as shown in FIG. 4. The drill and chuck are of any known type and form no part of the invention. A hollow collar member 30 is fixed around the forward end of the spindle 28 to abut against the forward end of the sleeve 12. Two projections 31 are formed on the rear side of the collar 30, which are loosely fitted within the notched portions 18 so that relative rotary movement is limitedly permitted between the sleeve 12 and the spindle 28.

The spindle 28 has a socket member 32 screwed thereon adjacent to the rear end. A coil spring 34 interconnects the socket 32 with the plug member 24 thus forming a "flexible driving connection" between the input member and the output member. The torsional strength of the spring 34 can be varied by changing the position of the pin 26 engaging the pocket 22 as described specifically hereinafter, and normally is preset in accordance with the critical torque expected in connection with a particular drill Dr.

A reaction rod 36 is disposed in the opening 24b of the plug member 24 and is pressed against the rear end of the spindle 28 by a compression spring 38 so as to be axially movable. The abutting faces 40 of the spindle 28 and the reaction rod 36 are of complementary configurations as shown in FIG. 2, each having a plurality of the tops 40a and the bottoms 40b. An inclined cam surface 40c extends between each top 40a and bottom 40b. When the drill Dr is rotating under the resistance lower than the preset critical torque, the tops 40a of the spindle 28 engage with the bottoms 40b of the reaction rod 36 so that the spindle and the rod are rotated conjointly without any gap between them.

Around the rear end of the reaction rod 36, indentations 42 are formed longitudinally which engage with a complementarily shaped bore of a cap nut 44 screwed on the rear end of the plug member 24. Thus, the reaction rod 36 is permitted to move longitudinally within said bore, but prevented to rotate therewithin.

By pushing the plug member 24 against the forces of the spring 34 and rotating the plug in any direction, the position of the pin 26 engaging the pocket 22 can be varied so that the torsional strength of the spring 34 can be adjusted in accordance with the critical torque expected for a particular drill.

In operation, driving force is transmitted from the pulley 16 through the sleeve 12, the pin 26, the plug member 24 and the coil spring 34 to the spindle 28 and the drill Dr to rotate all movable parts conjointly. During the drilling operation, if the drill Dr is subjected to the torque exceeding the preset torque (which is predetermined by adjusting the torsional strength of the spring 34), the rotation of the spindle 28 is delayed as compared to the driving sleeve 12 and the relative rotary movement takes place between the spindle 28 and the sleeve 12. Since the sleeve 12, the plug member 24 and the reaction rod 36 contained therein are adapted to rotate always in the same speed, relative rotary movement also occurs between the spindle 28 and the reaction rod 36 so that the cam surfaces 40c of the spindle 28 urge the cam surfaces 40c of the reaction rod 36 to move the rod 36 longitudinally and rearwardly. Thus, the reaction rod 36 displaces rearwardly and projects from the bore to indicate that the drill is being subjected to the torsional resistance at least equal to or greater than the preset critical torque value.

Figure 5:
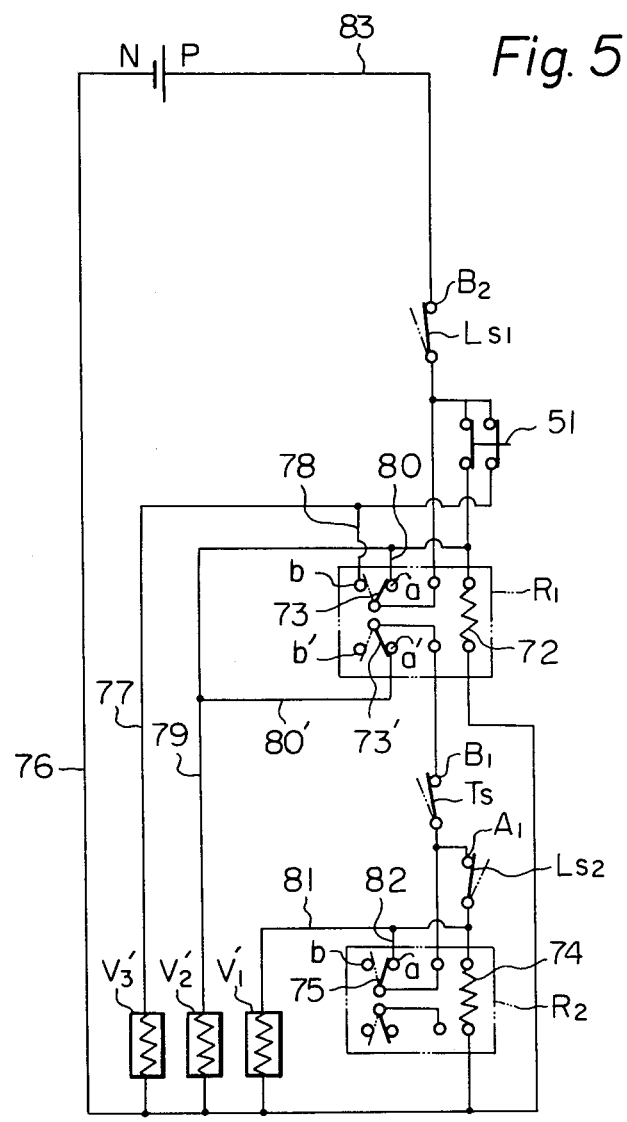
FIG. 5 is an electrical circuit used for actuating the hydraulic circuit of FIG. 4.

The present invention intends to detect the critical torque or torsional resistance suffered by the drill during its drilling operation as described above and also to retract the drill assembly immediately upon the detection of such critical torque. For the latter purpose, FIGS. 4 and 5 illustrate the control system for controlling the movement, i.e. advancing and retracting, of the drill Dr.

In FIG. 4 the drill assembly, i.e. the casing 10 having the drill Dr secured thereto by means of the chuck Ch, is supported by a support 46 which is fixed to a slider 48. A motor 50 on the support 46 is for driving the drill Dr.

The slider 48 is adapted to move back and forth on the stationary block 52. On the upper surface of the slider 48, a torque switch Ts, first and second limit switches Ls1 and Ls2 are disposed as shown in FIG. 4. A hydraulic cylinder 54 is attached to the rear end of the slider 48. The interior of the hydraulic cylinder 54 is divided into two chambers A and B by a piston 56 having a piston rod 57 fixed to the stationary block 52 by means of an arm 58. A contact member 59 is formed on the arm 58 to actuate limit switches Ls1 and Ls2.

In FIG. 4, four ports-two positions solenoid valve V1 is provided in the conduits 60 and 61 connecting the pump P and the reservoir T to the chambers A and B of the cylinder 54. A control valve 62 disposed in the conduit 60 is to control the flow of hydraulic fluid. V3 is two ports-two positions solenoid valve having the ports connected selectively through branches 63 and 64 to the conduit 60. A cylinder 65 has chambers C and D divided by a free piston 66, the chamber D being connected through a conduit 67 to the branch 64.

The torque switch Ts is positioned adjacent to the rear end of the reaction rod 36 and a normally closed contact B1 as shown in FIG. 5. When the drill is subjected to the critical torque and the reaction rod 36 is caused to retract as described hereinabove, contact B1 is opened as shown in dotted line in FIG. 5.

The first limit switch Ls1 has a normally closed contact B2 as shown in FIG. 5 which, at the end of advancing stroke of the slider 48, is opened by the contact member 59 as shown in dotted line in FIG. 5. The second limit switch Ls2 has a normally open contact A1 (FIG. 5), which at the end of the retracting stroke, is closed by the contact member 59.

FIG. 5 illustrates the electric circuit controlling the solenoids V1', V2' and V3' of the above mentioned solenoid valves V1, V2 and V3, respectively. R1 is a relay having a magnetic coil 72, contacts a and b, armatures 73 and 73'. When the start button switch 71 is pushed and the electric current passes through the coil 72, the armature 73 is attracted to the contact a. R2 is another relay. When the electric current passes through a magnetic coil 74, the armature 75 is attracted to the contact a. One terminal of the solenoid V3' of the solenoid valve V3 is connected through the conductor 77 to one side of start switch 71. A conductor 78 branched from the conductor 77 is connected to the contact b of the relay R1.

One terminal of the solenoid V2' of the solenoid valve V2 is connected to the conductor 76, and another terminal is connected to one contact of the start switch 71 through the conductor 79, of which branched conductors 80 and 80' are connected to the contacts a and a' of the relay R1.

One terminal of solenoid V1' of the solenoid valve V1 is connected to the conductor 76, and another terminal is connected through the conductor 81 to the coil energizing the conductor of the relay R2. The conductor 81 is also connected through the branched conductor 82 to the contact a of the relay R2.

A conductor 83 connected to the positive side P of the power source is connected through the limit switch Ls1, start switch 71 and coil 72 of the relay R1 to the negative side N of the power source. A conductor parallel to start switch 71 connects the limit switch Ls1 with the armature 73 of the relay R1, and the another armature 73' of the relay R1 is connected through the torque switch Ts to the armature 75 of the relay R2, on one hand, and through the second limit switch Ls2 and coil 74 of the relay R2 to the negative side N of the power source, on the other hand.

Now, the operation of the present control system will be described in conjunction with FIGS. 4 and 5. FIG. 4 illustrates a condition in which the hydraulic cylinder 54 is in the rearmost position with regard to the piston 56 and the second limit switch Ls2 is closed by the contact member 59 on the arm 58. In this condition, when the start switch 71 is pushed and closed as shown in FIG. 5, the relay R1 and the relay R2 are energized to form self-holding circuit as the contacts of the first limit switch Ls1, to torque switch Ts and the second limit switch Ls2 are closed, so that the solenoids V1', V2' and V3' are energized to turn on the respective solenoid valves. Consequently, the hydraulic fluid is directed from the pump P through the valve V1 and the conduit 61 to the chamber B of the cylinder 54 while the hydraulic fluid in the chamber A flows out through the valve V3 and the control valve 62, and then through the solenoid valve V1 into the reservoir T, thereby advancing the cylinder 54 and the slider 48. The hydraulic fluid flowing out of the chamber A goes through the passage in the solenoid valve V3 which has a far greater area than that of the control valve 62 so that the cylinder 54 and the drill assembly attached thereto are advanced with high speed. Since the chamber C of the hydraulic cylinder 65 is connected through the valves V2 and V1 to the reservoir, a portion of the fluid flowing out of the chamber A seeks to enter the chamber D of the cylinder 65, but the amount of that portion can be neglected so far as the chamber D is filled with the fluid.

When the drill Dr comes close to the workpiece, the push button switch 71 is released and opened to turn off the valve V3. Thus, the fluid in the chamber A flows out only through the control valve 62 which has a narrow passage so that the speed of the advancing drill Dr is reduced to a level at which the drilling operation is performed.

As described previously, when the drill Dr is subjected to the critical torque during the drilling operation, the reaction rod 36 projects rearwardly from the plug member 24 to turn off the torque switch Ts, and the relay R2 is de-energize the solenoid V1'. At this moment, the solenoid valve V2 is in ON condition and the solenoid valve V3 is in OFF condition. Thus, the hydraulic fluid flows through the solenoid valve V1, the conduit 60 and the control valve 62 into the chamber A, while a portion of the fluid flows through the valve V2 into the chamber C of the cylinder 65, to cause the free piston 66 to go down thereby to push out the fluid in the chamber D through the conduit 67 into the chamber A of the cylinder 54. Therefore, the cylinder 54 is rapidly retracted.

When the slider 48 reaches the rearmost position, the limit switch Ls2 attached thereon is engaged by the contact member 59 fixed on the arm 58 to close its contact A1 (as shown by the solid line in FIG. 5). Then, the relay R2 is energized to switch the armature 75 to the contact a thereby to energize the solenoid V1' of the valve V1. Now, the fluid is directed from the pump P through the valve V1 and the conduit 61 into the chamber B, while from the chamber A is discharged the fluid amounting to that portion which was previously discharged from the cylinder 65 to flow back into the chamber D, thus re-advancing the slider 48 and the drill assembly to that position where the drill Dr was previously subjected to the critical torque. In this respect, the cylinder 45 functions as a memorizer.

When the spindle 28 reaches the extreme position in the forward direction by the movement of the slider 48, the limit switch Ls1 is engaged by the contact member 59 of the arm 58 to be off, and self-holding circuit of the relays R1 and R2 are elapsed, and the solenoids V1' and V2', are de-energized to turn off the valves V1 and V2, respectively. At this moment, the valve V3 has been OFF. The hydraulic fluid flows through the valve V1, the conduit 60, the control valve 62 into the chamber A, and, on the other hand, the fluid in the chamber B flows out through the conduit 61, and the valve V1 to the reservoir T so as to retract the cylinder 54. At the beginning of retracting movement, the limit switch comes back to ON, and the electric current passes through the armature 73, the contact b of the relay R1, the conductors 78 and 77 to the solenoid V3 to energize the same to thereby turn on the valve V3. The hydraulic fluid flows through this valve V3 into the chamber A, to cause the cylinder 54 and the drill assembly to go back with high velocity. On the other hand, a portion of the fluid flows through the conduit 67 into the chamber D to push up the free piston 66. At this moment, the valves V2 and V1 are in OFF, and the chamber C is communicated with the reservoir T.

Referring to FIGS. 6–8, a varied form of the apparatus shown in FIGS. 1–3 is illustrated. Within the stationary casing 10, a first sleeve 12 is rotatably disposed and a second or inner sleeve 12a is inserted and screwed into the inside of the rear end of the first sleeve 12. A longitudinal slot 12b is formed in the second sleeve 12a. Within the second sleeve 12a, a reaction rod 36 is disposed having a pin 36a fixed thereon and projecting in the slot 12b. Thus, the reaction rod 36 can be rotated from and moved longitudinally within the second sleeve 12a. A compression spring 38 urges the reaction rod 36 toward the mating surface 40 of the spindle 28 supporting the drill at its forward end. The first sleeve 12 is provided with a circumferential slot 18' adjacent to its forward end in place of the notched portions 18 shown in FIG. 1, and the spindle 28 is provided with a pin 31' projecting in the slot 18' instead of the projections 31 shown in FIG. 1. The input rotating member of this varied form comprises the first sleeve 12, the second or inner sleeve 12a, and the reaction rod 36 having the pin 36a thereon. The reaction rod functions also as a detecting means.

Although the spring 38 is utilized in the apparatus shown in FIG. 6, other means can be utilized in order to thrust the reaction rod 36 upon the mating surface 40 of the spindle 28. For example, in case the apparatus of FIG. 6 is employed in a vertical disposition with the nose end 28a down, weight means (not shown) can be mounted on the upper end of the reaction rod 36. Specifically, a saucer or a plate may be attached to the upper end of the reaction rod 36, and a weight piece or pieces may be put on this saucer to vary the force pushing the drill against the workpiece. The adjusting of the weight can be done even if the drill is rotating and performing drilling operation. By adding incrementally weight pieces, the critical torque that the drill can tolerate is determined during the drilling operation.

Figure 9:
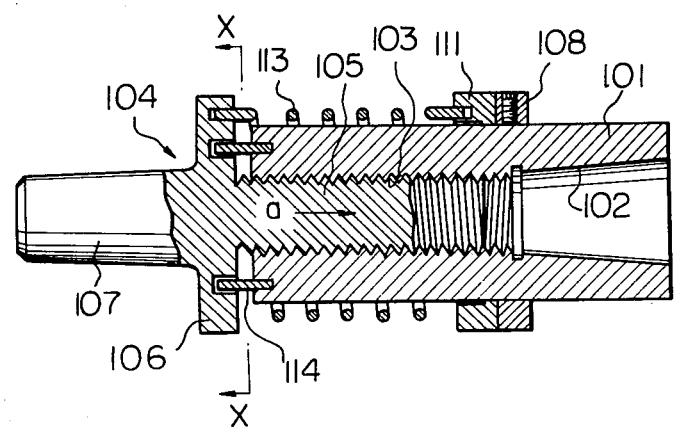
FIG. 9 is an elevational view partly in section of a second embodiment.
Figure 10:
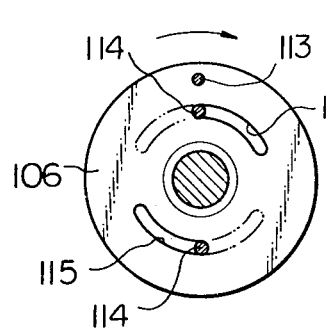
FIG. 10 is a sectional view taken along the line X—X in FIG. 9.
Figure 11:
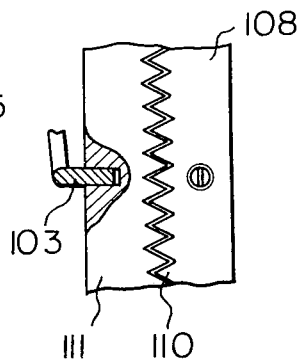
FIG. 11 is an enlarged fragmentary plan view showing an adjusting ring and an annular member used in FIG. 9.
Figure 12:
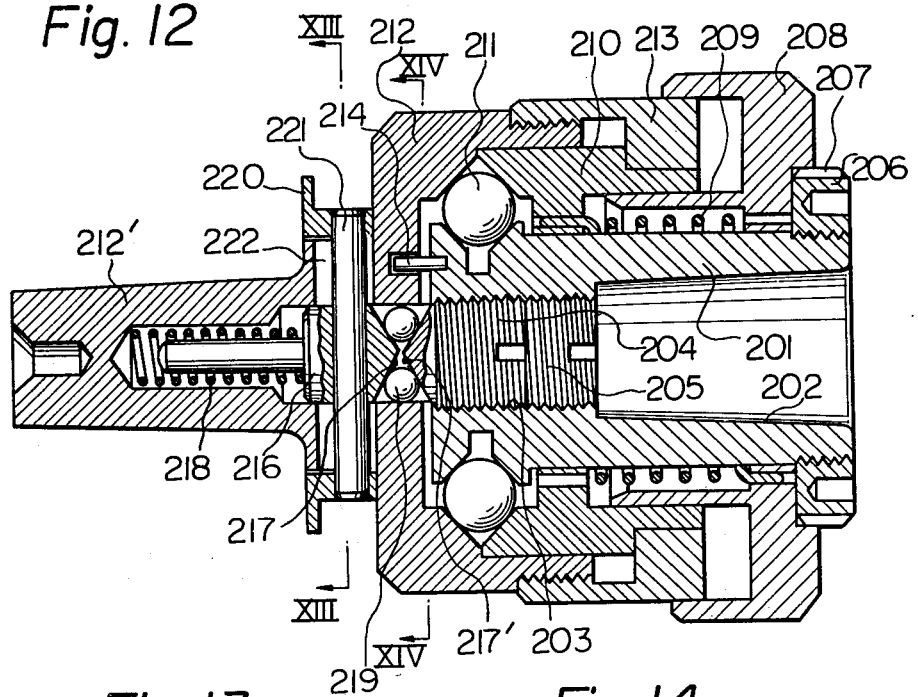
FIG. 12 is a sectional elevational view of a third embodiment of the invention.
Figure 13:
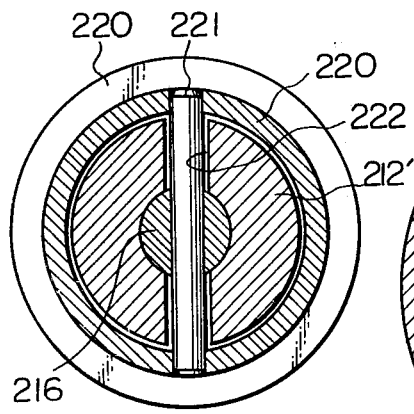
FIG. 13 is a sectional view taken along the line XIII—XIII in FIG. 12.
Figure 14:
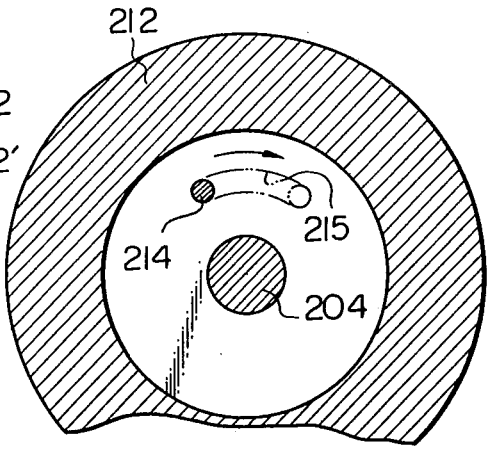
FIG. 14 is a fragmentary sectional view taken along the line XIV—XIV in FIG. 12.
Figure 15:
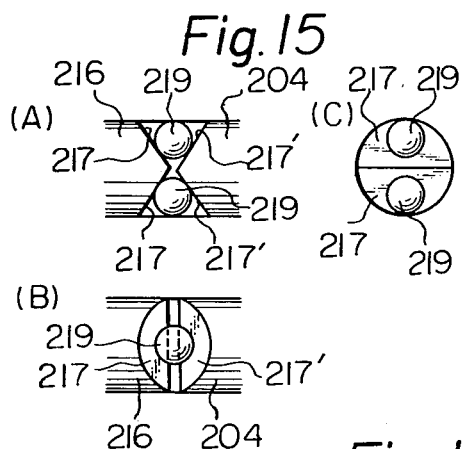
FIG. 15 is a side elevational (A), a plan (B) and an end (C) views of slanted cam surfaces of a plug and a rod, respectively, shown in FIG. 12.

FIGS. 9–11 show a second embodiment of the torque detector of the present invention. An input member or a rotating tubular member 101 has a tapered bore 102 and a threaded bore 103. The tapered bore 102 is to receive a rotating motor shaft (not shown) and is supported thereby, so that the stationary casing for supporting the rotating member 101 is not necessary in this embodiment. An output member 104 comprises a threaded portion 105 screwed into a portion of the threaded bore 103, a flanged portion 106 formed integrally with the threaded portion 105 and also functioning as detecting means, and a tapered nose end portion 107 for mounting a drill chuck (not shown). An annular member 108 is secured to the outer circumference of the input member 101 as by a screw, and is formed with saw teeth configurations 110 at its foward side face as seen from FIG. 11. An adjusting ring 111 is loosely fitted around the input member 101 and engages with the annular member 108 at its rear side face 112 configured complementarily with the saw teeth configurations 110 of the member 108. A coil spring 113 connects the adjusting ring 111 with the flange 106 of the output member, thus forming the flexible driving connection between the input and output members. The torsional strength of the spring 113 is adjusted to a value that is likely to correspond to the critical torque expected for a particular drill to be tested. Adjusting of the torsional strength is accomplished by pushing the ring 111 against the spring 113, and rotating the same in any direction.

Pins 114 are fixed on the forward end surface of the input member 101 and project therefrom into circular grooves 115 formed on the rear surface of the flange 106 thus permitting limitedly relative movement between the input and output members. When the drill is subject to a torque lower than the predetermined critical torque, the pins 114 are positioned at the one end of the grooves 115 as shown by the solid lines in FIG. 10.

In operation, the rotating force is transmitted from the input member 101 through the annular member 108, the adjusting ring 111 and the coil spring 113 to the output member 104. In the course of drilling operation, if the drill is subjected to a torque greater than the predetermined value (which is determined by the torsional strength preset for the spring 114), the output member 104 will be shifted to a position indicated by the fantom lines in FIG. 10. The delay in rotation causes the threaded portion 105 to move in the direction of arrow a in FIG. 9 (assuming that the input member is rotating in the clockwise direction as viewed from the right hand side of the drawings and thread is of right hand screw). Thus, upon occurring of a greater torque over the predetermined critical torque, the output member 104 is caused to shift in the longitudinal direction, and this longitudinal movement can be taken out as from the flange 106 and a microswitch (not shown) positioned adjacent to the flange as a signal to the control system of FIG. 4.

A third embodiment of the torque detector of the present invention is illustrated in FIGS. 12–16. An input tubular member 201 has a tapered bore 202 and a threaded bore 203 formed coaxially therewithin. Into the tapered bore 202 is inserted the rotating motor shaft (not shown) for driving and supporting the input member 201. A plug member 204 is screwed into the threaded bore 203 and fixed in place by a stop member 205. The plug member 204 is formed with sloped cam surfaces 217' at its forward end as described in detail hereinafter. A connecting ring 206 is threadedly fixed around the rear end of the input member 201 and has teeth around the outer circumference. An adjusting cap member 208 is loosely fitted over the input member 201 and engages at its rear end with the connecting ring 206 by means of teeth formed complementarily with the teeth of the ring 206. The cap member 208 is connected to an intermediate sleeve 210 by a coil spring 209 to form the flexible driving connection between them. The cap 208 can be pushed against the spring 209 and rotating in any direction to change the torsional strength of the spring 209 so as to predetermine the expected critical torque to be loaded to the drill. The intermediate sleeve 210 has a tapered forward end.

An output member 212 in the cup like shape is disposed around the forward ends of the input member 201 and the intermediate sleeve 210, and is connected to a connector ring 213 fixed to the sleeve 210. The output cup member 212 is provided with a tapered portion on its inside in opposite relation with the tapered end of the sleeve 210, thus forming a V-shaped groove between them to accomodate a plurality of balls 211 for bearing purpose. The output cup member 212 has an integral tapered portion 212' projecting forwardly for mounting a drill chuck (not shown). The cup member 212 and its mounting portion 212' have a central bore formed coaxially with the bores of the input member 201. A pin 214 projects from the forward end surface of the input member 201 into a circular slot 215 formed on the interior wall of the cup member 212 to permit limited relative rotation between the input and output members.

Figure 16:
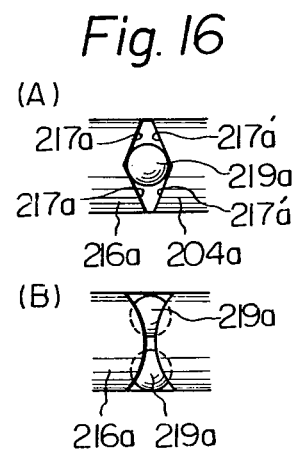
FIG. 16 is a side (A) and a plan (B) views of an other forms of the slanted cam surfaces.

A rod member 216 is disposed within the central bore of the output member 212 and its projections 212' coaxially with the plug member 204, and has sloped cam surfaces 217 in opposite relation to the sloped cam surfaces 217' of the plug 204 to accomodate balls 219 between them. A spring 218 pushes the rod member 216 toward the plug 204 to make the distance between them shortest. The sloped or slanted cam surfaces 217 and 217' may be configured as shown in detail in FIG. 15, while the other configurations such as shown in FIG. 16 is also utilized. In any case, if the relative rotation occurs between two shaft members, balls included between them cause either of two shaft members to move longitudinally.

Loosely fitted over the root portion of the mounting member 212' is a detecting collar member 220 which is connected to the rod member 216 by a connecting pin 221 passing transversely through the rod 216 and secured to the to the collar member 220 at each end thereof. The connecting pin 221 is accomodated within a radial slot 222 formed in the root portion of the member 212'. The width of the slot 222 in a plane transverse to the axis of the member 212' is substantially equal to the diameter of the pin 221, and the width of the same in a plane parallel to the said axis is greater than the diameter of the pin 221. Consequently, the detector collar 220 can move only in the longitudinal direction, but not in the rotational direction.

In operation, the rotation is transmitted from the input member 201, through the ring 206, the cap 208, the coil spring 209, the intermediate sleeve 210 and the connector 213 to the output member 212 to rotate the drill mounted on the tapered portion 212' for performing the drilling operation. When the drill is subject to a twisting resistance exceeding the value predetermined by the adjustment of the spring 209, the output member 212 including the rod member 216 is delayed in rotation as compared to the input member 201 including the plug 204. Consequently, the cam surfaces 217 is angularly displaced with respect to the cam surfaces 217' to cause the rod member 216 to be shifted longitudinally along with the detector collar 220. The displacement of the collar 220 can be sensed by a microswitch (not shown) positioned adjacent thereto to produce a signal to actuate the control circuit for retracting the drill assembly to avoid the failure of the drill.

Figure 17:
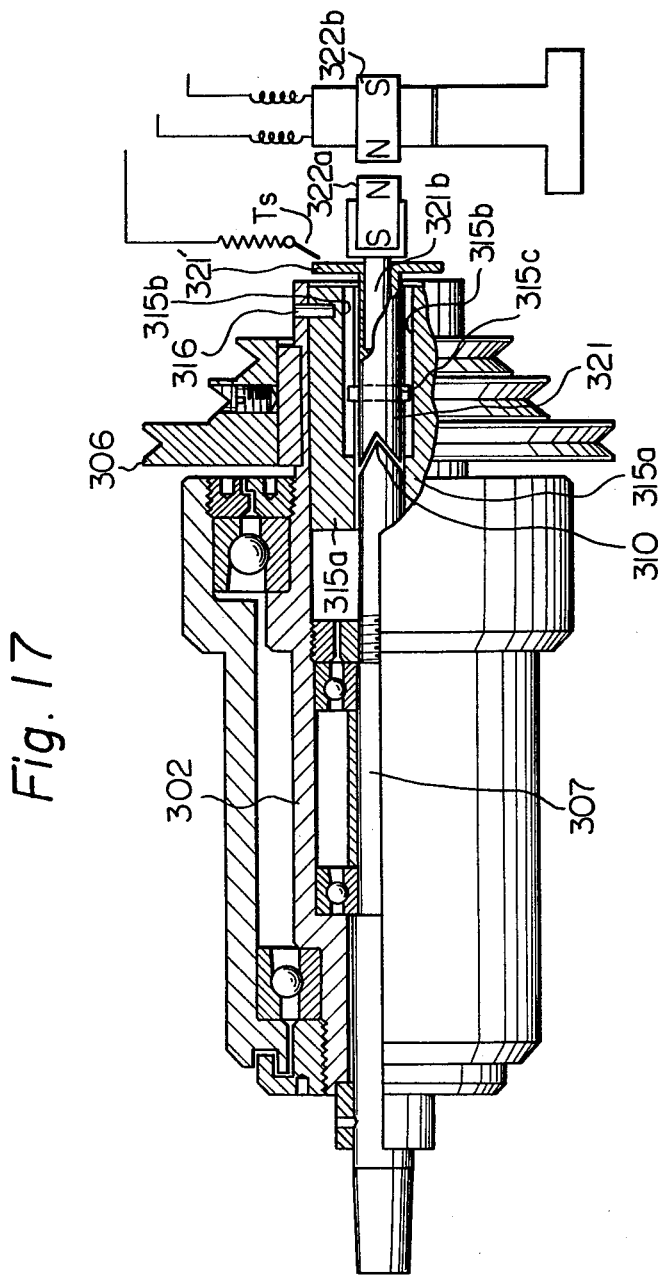
FIG. 17 is a fourth embodiment of the invention in which magnetic forces are utilized in place of spring forces in the previous embodiments.

FIG. 17 shows a fourth embodiment of the invention in which repelling forces between two magnets are utilized in place of spring forces in the previously described embodiment. A sleeve 302 is rotated by an input rotating force from a pulley 306. In the interior of the rear portion of sleeve 302 is fixed a transmitting block 315a in the annular form by a pin 316. The block 315a surrounds the mating surfaces 310 of the spindle 307 and the reaction rod 321. A key way 315b is formed longitudinally on the interior surface of the block 315a. A transmitting pin 315c projects transversely from the reaction rod 321, and projected ends of the pin 315c is received in the key way 315b so as to be able to slide longitudinally. A magnet support 321b of insulating material is inserted at its inner end in the rear end of the reaction rod 321, and supports at its outer end a permanent magnet 322a. In opposite relation to this magnet 322a, an electromagnet 322b is disposed. The same poles of the respective magnet are faced side-by-side as shown, so that repelling forces occurs between them. The repelling forces can be varied by changing the electric current passing through the electromagnet 322b.

In operation, the spindle 307 and the drill mounted thereon are rotated from pulley 306, through the block 315a, the pin 315c, the reaction rod 321 and the mating surfaces 310. When the drill encounters the resistance in the drilling operation exceeding the preset critical torque, the drill and the spindle are caused to be delayed in rotation, so that the reaction rod 321 is pushed rearwardly through the co-relation of the mating surfaces 310 in the same manner as described in connection with FIG. 1. A torque switch Ts is located adjacent to the flanged portion 321' of reaction rod 321 and is contacted by the retracting flange 321' to actuate the control circuit for discontinuing the drilling operation.

In this embodiment, repelling force against the magnet 322a can be varied by changing the electric current passing through the magnet 322b. The greater repelling forces, the greater twisting moment the drill is subjected to. Because the changing of electric current can be done even during the drilling operation, the critical torque can be detected "dynamically" by increasing more and more the electric current, whereas in the previously described embodiment the detection of the critical torque can only be done "statistically" or in a batchwise manner.

Figure 18:
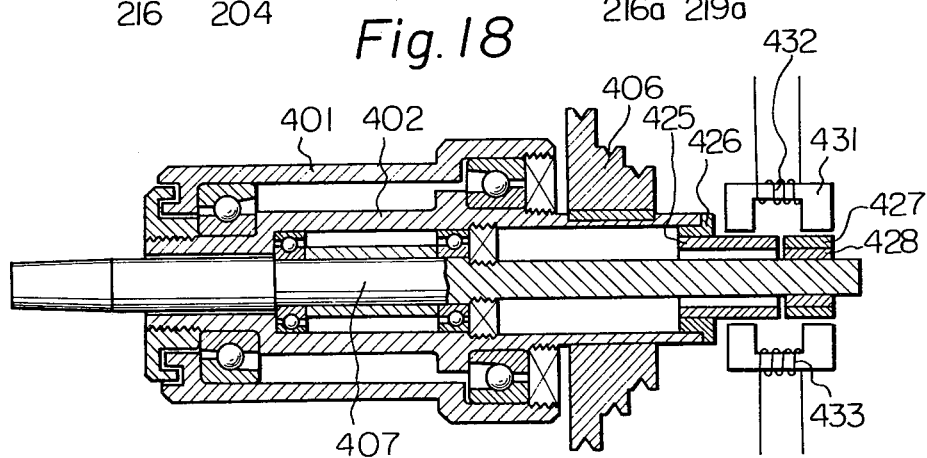
FIG. 18 is a fifth embodiment of the invention in which changes in electric current are utilized for detection of the critical torque.
Figures 19, 20:
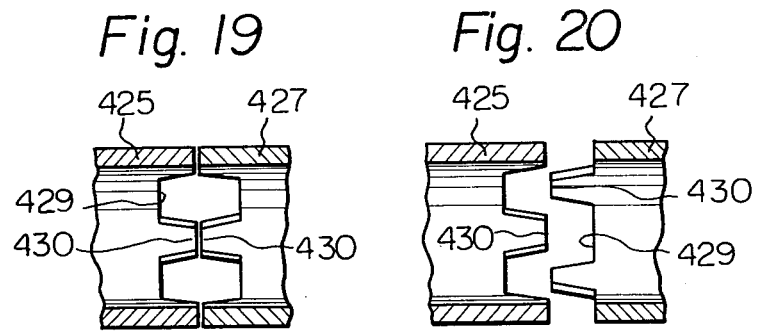
FIG. 19 is an enlarged fragmentary sectional view of two magnetic tubes showing the condition in which respective projections are opposed each other.
FIG. 20 is a view similar to FIG. 19 but showing the condition in which respective projections are not opposed each other.

FIG. 18 shows a fifth embodiment of the present invention. A non-rotating casing 401 supports rotatably a rotating sleeve 402 which has a pulley 406 keyed thereon and a spindle 407 rotatably supported therein. In the rear end of the sleeve 402, a tube of magnetic material 425 is attached by means of an insulator 426 and surrounds the spindle 407 with a small clearance. A further magnetic tube 427 is disposed coaxially with and in an end-to-end relation with the magnetic tube 425. The second magnetic tube 427 is fixed on the rear end of the spindle 407 by an insulator 428. Adjacent ends of the respective tubes 425 and 427 are provided with notches 429 and projections 430 as shown in FIG. 19. A U-shaped core 431 having two poles is arranged near to the respective magnetic tubes with one pole adjacent to the tube 425 and other pole adjacent to the tube 427. The core 431 will be magnetized by the electric current flowing through a coil 432 wound thereon. 433 is a coil for detecting variations in lines of magnetic forces flowing through the opposed ends of tubes 425 and 427.

When the core 431 is magnetized, lines of magnetic forces flow between two poles of the core 431, exerting forces on the adjacent ends of the tube 425 and the tube 427 to the magnetic path through the adjacent ends to be shortest, so that the tubes 425 and 427 are arranged with the respective projections 430 opposed to each other as shown in FIG. 19. In this condition, the spindle 407 is rotated from the rotating sleeve 402 through a flexible driving connection magnetically produced between the tubes 425 and 427. The strength or intensity of the magnetic forces exerted on the tubes 425 and 427 is determined by the electric current flowing through the coil 432 and may be changed in accordance with the critical torque expected for a specific drill to be mounted on the spindle 407.

When the drill is subjected to the torsional resistance greater than the predetermined critical torque during its drilling operation, the spindle 407 will be delayed in rotation with regard to the input sleeve 402 so that the relative displacement between the tubes 425 and 427 will occur as seen from FIG. 20. Thus, the lines of magnetic forces flowing through the ends of the tubes 425 and 427 are influenced and varied momentarily to induce voltage variations in the coil 433 which, as detected by any known means, function as a signal to actuate the control system for retracting the drill assembly.

Figure 21:
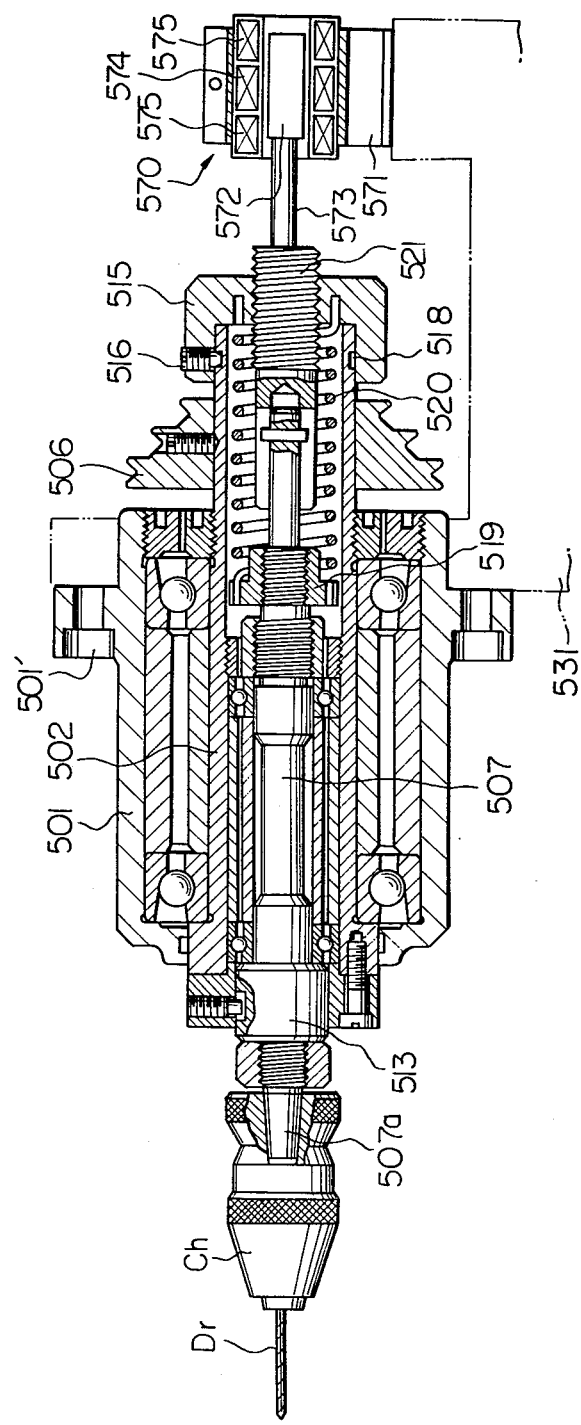
FIG. 21 is a sixth embodiment of the invention for electrically measuring and indicating the torque imposed on the drill and change in that torque.

Finally, a sixth embodiment of the present invention will be described in connection with FIG. 21. A cylindrical casing 501 is attached to a support 531 which is comparable to the slider 48 shown in FIG. 4 by a suitable fastening means 501'. Within the casing a rotatable input sleeve 502 having a pulley 506 keyed thereon is supported. A spindle 507 is rotatably supported within the rotating sleeve 502 and has a tapered nose end 507a on which is mounted a chuck Ch having a drill Dr. The spindle 507 is formed with a collar 513 adjacent to its nose end having a circumferential slot into which a pin projecting from the sleeve 502 is loosely received so as to permit the limited relative displacement between the sleeve and the spindle. A cap member 515 having an axial bore is adjustably fixed on the rear end of the rotatable sleeve 502 by a set screw 516 which can be selectively engaged with any one of holes 18 formed on the sleeve 502. A socket member 519 is attached to the rear end of the spindle 507 and is connected to the cap member 515 by a coil spring 520 to form a flexible driving connection therebetween. The torsional strength of the spring 520 can be changed by rotating the cap member 515 in any direction after loosing the set screw 516. The strength of the spring 520 is to be set in accordance with the critical torque expected for a particular drill to be tested. A threaded rod 521 is screwed into the axial bore of the cap member, which can rotate conjointly with the spindle and move longitudinally through the axial threaded bore of the cap member 515.

In the rear of the threaded rod 521, a differential transformer 570 is supported by a fixture 571 on the slider 531. A core of high permeability 572 of the transformer is connected by an insulated rod 573 to the reaction rod 521. The core 572 is inserted into a primary winding 574 and secondary windings 575. The difference between electromotive force created by alternating voltage impressed on the primary winding 574 and electromotive force induced to the secondary windings 575 can be taken out as a secondary voltage by any suitable means. The value of secondary voltage will be changed linearly with the axial movement of the core 572 through the windings.

In the drilling operation, when the torsional resistance exerted on the drill becomes greater than the critical torque preset by the adjusted strength of the spring 520, the rotation of the spindle 507 and the rod 521 is delayed with respect to the input sleeve 502 and the cap member 515, so that the relative rotation will occur between the rod 521 and the cap 515 to cause the rod 521 to proceed rearwardly through the threads formed thereon. Therefore, the core 572 is displaced longitudinally through the windings 574 and 575 to change the value of secondary voltage. The value and change of secondary voltage can be electrically taken out and registered for detecting momentarily the critical torque imposed on the working drill.

While a few embodiments of the invention have been illustrated and described in detail, it is particularly understood that the invention is not limited thereto or thereby.

I claim:

1. An apparatus for detecting the critical torque imposed on a rotating drill, comprising:
   a rotating input member,
   an output member for supporting said drill and connected in a flexible driving connection with said rotating input member, and
   means for detecting the difference in rotational speed between said input and output members, when said drill is subjected to a torque greater than the predetermined critical torque,
   said rotating input member including;
   a rotating sleeve having a pulley keyed thereon,
   a plug member inserted in said sleeve and connected by a pin selectively engaging with said sleeve, and
   a coil spring connecting said sleeve with said output member,
   said output member including;
   a spindle for supporting a drill at its forward end, said spindle having a socket member fixed thereon and connected by said spring with said rotating sleeve, and cam surfaces at its rear end, and
   said detecting means including;
   a reaction rod which is disposed within said plug member so as to be movable longitudinally and rotatable conjointly with said plug member, and is urged toward said output spindle to engage with said cam surfaces of said spindle, and
   switch means located adjacent to one end of said reaction rod so as to be contacted by said reaction rod when moved longitudinally.

* * * * *